United States Patent [19]

Nelson

[11] 4,017,139
[45] Apr. 12, 1977

[54] POSITIVE LOCKING ELECTRICAL CONNECTOR

[75] Inventor: Wilfred Nelson, Laguna Hills, Calif.

[73] Assignee: Sealectro Corporation, Mamaroneck, N.Y.

[22] Filed: June 4, 1976

[21] Appl. No.: 692,891

[52] U.S. Cl. .............................. 339/91 R; 285/316; 339/177 R
[51] Int. Cl.² .................. F16L 37/08; H01R 13/54; H01R 13/56
[58] Field of Search ............ 339/45 R, 45 M, 91 R, 339/91 P, 126 J, 177 R; 285/315–317

[56] References Cited
UNITED STATES PATENTS

| | | | |
|---|---|---|---|
| 3,206,540 | 9/1965 | Cohen | 339/91 P X |
| 3,745,514 | 7/1973 | Brishka | 339/91 R |
| 3,808,579 | 4/1974 | Mina et al. | 285/316 X |
| 3,953,098 | 4/1976 | Avery et al. | 339/91 R X |

*Primary Examiner*—Roy Lake
*Assistant Examiner*—E. F. Desmond
*Attorney, Agent, or Firm*—Anthony J. Casella; Joseph A. Calvaruso

[57] ABSTRACT

A female plug connector for receiving a standard jack has an outer sleeve having an annular edge at one end. On the interior of said sleeve are a locking surface of reduced diameter and a first and second containing surface of reduced diameter. The plug further has a tubular insert, slidably received in the outer sleeve, having at one end, longitudinally extending slits, forming slotted members to allow for radial expansion. The insert includes exterior protrusions of reduced diameter to be received in the annular groove of the jack, and an outer annular projection which bears against the locking surface of the outer sleeve when the plug is in the locked position. The tubular insert also has a first and second outer annular containing surface. The female plug connector further includes a first retaining means bearing against the first interior containing surface of the outer sleeve, and the first outer annular containing surface of the plug insert. A second retaining means bears against the second interior containing surface and the second outer annular containing surface of the plug insert. Disposed between the first and second retaining means is a spring for locating the outer sleeve in its normal position relative to the insert. A retainer ring is disposed around the slotted members of the insert, between the outer annular projections of the tubular insert and the first retaining means.

7 Claims, 7 Drawing Figures

POSITIVE LOCKING ELECTRICAL CONNECTOR

BACKGROUND AND SUMMARY OF THE INVENTION

The present invention relates to coaxial and multi-conductor cylindrical connectors. Specifically, it is an improvement upon the invention of Alexander R. Brishka, U.S. Pat. No. 3,782,840, entitled "Mechanical Coupling" which issued on Jan. 1, 1974, said patent and the subject invention being owned by the same assignee.

In operation, it has been found that connectors made according to U.S. Pat. No. 3,782,840 have had several shortcomings as a result of their complex construction. In fact, it has been found that after a period of use they have a tendency to malfunction and fall apart, and in addition the complexity of the connectors resulted in high production costs.

Accordingly, it is an object of the subject invention to provide electrical connectors that will not fail after continued use, and are capable of being produced at lower costs.

It is another object of the subject invention to provide electrical connectors that are simple in structure yet which effectively exhibit quick connect-disconnect and positive locking features.

The connectors of the subject invention are a male jack and a female plug. The male jack is one that is standard in the connector industry. It has a tubular body having an annular groove disposed intermediate its length. The female plug connector includes a tubular outer sleeve havinga at one end an annular edge. In its interior the sleeve includes an interior locking surface of reduced diameter and a first and second interior containing surface of reduced diameter. The female plug connector further includes a tubular insert, slidably received in the outer sleeve, having at one end, longitudinally extending slits, forming slotted members to allow for radial expansion. The tubular insert further has interior protrusions of reduced diameter corresponding in configuration to the annular groove of the jack, and outer annular projections which bear against the locking surface of the outer sleeve when the female plug connector is in the locked position. The tubular insert further has a first and second outer annular containing surface.

The female plug connector further includes a first split washer bearing against the first interior containing surface of the outer sleeve and the first outer annular containing surface of the tubular insert. Also included is a second split washer which bears against the second interior containing surface of the sleeve and the second outer annular containing surface of the tubular insert. Disposed between the split washers is a helical spring for biasing the position of the outer sleeve relative to the insert.

Further included in the female plug connector is a beryillium copper retaining ring which is disposed around the slotted members of the tubular insert, between the outer annular projections of the tubular insert and the first split washer. This retaining ring provides compression to the slotted members of the tubular insert so that the interior reduced diameter protrusions of the tubular insert of the female plug will properly engage with the groove of the jack. In the neutral state the outer annular projections of the tubular insert bear against the locking surface of the outer sleeve so that the slotted members of the tubular insert may not expand.

To connect the female plug and the male jack, an axial force is placed on the outer sleeve of the plug in a direction towards the jack. As a result, the annular projections of the plug no longer bear against the locking surface of the sleeve and the slotted members of the plug insert may expand to allow entry of the jack. When the interior reduced diameter protrusions of the plug insert reach the groove of the jack the retainer ring causes them to move into the groove effecting, the engagement. As the outer sleeve is released, the helical spring causes the sleeve to return to its normal position so that the outer annular projections of the plug no longer bear against the locking surface of the sleeve and the slotted members of the plug insert may expand. The jack may thus be disconnected.

BRIEF DESCRIPTION OF THE FIGS.

DESCRIPTION OF THE PREFERRED EMBODIMENT

Figure 1:
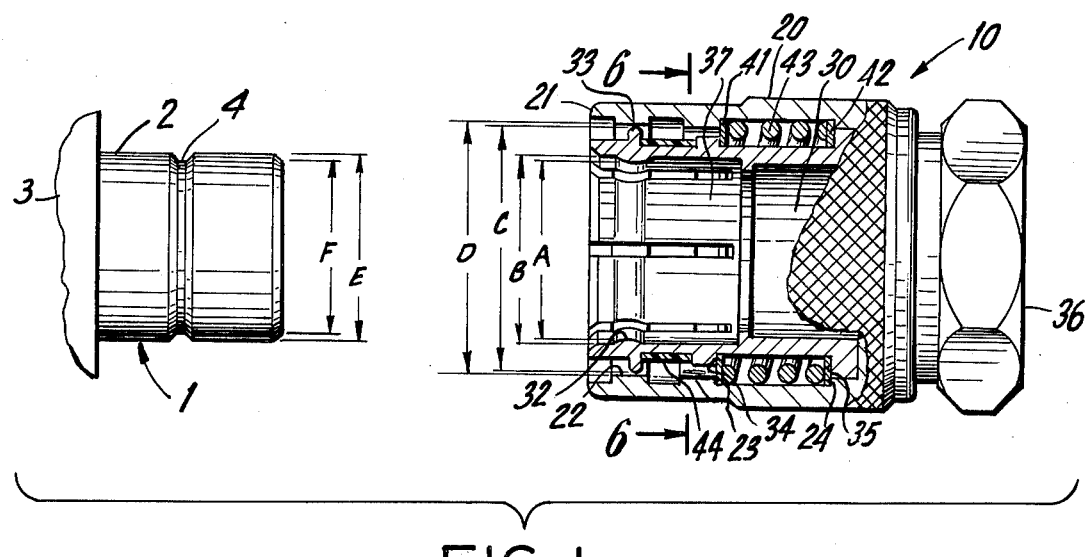
FIG. 1 is a side view of the jack and plug of the subject invention, the plug being sectioned in part.
Figure 6:
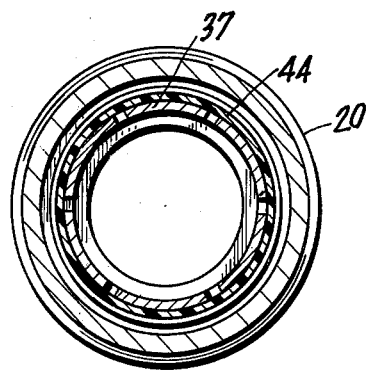
FIG. 6 is a vertical cross-section of the plug of the subject invention defined by line 6—6 of FIG. 1.
Figure 2:
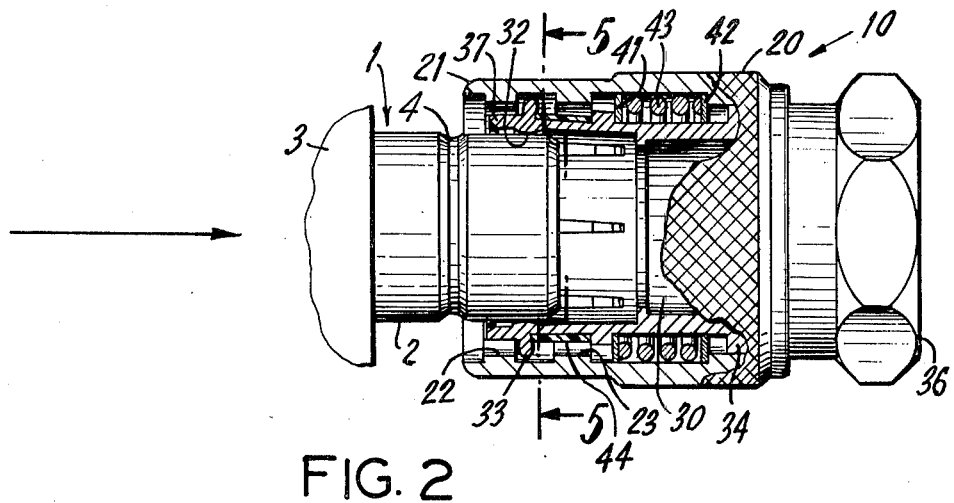
FIG. 2 is an elevational view depicting the engagement of the jack and plug of the subject invention. The plug is sectioned in part.

Referring to FIG. 1, the subject invention relates to coaxial connectors comprising a male jack 1 and a female plug 10. The male jack 1 is of a basic design use in the connector industry. It has a metallic tubular body 2 having an annular groove 4 disposed at a position intermediate its length. The body 2 may house one or more inner conductors separated by a dielectric material. The back end 3 of the jack 1 is adapted to accept cable or a panel.

The female plug 10 is so configured that it, in combination with jack 1, may exhibit quick connect-disconnect, positive locking features. It includes a tubular outer sleeve 20, having at one end an annular edge 21. On the innner surface of the sleeve 20 is an interior locking surface 22 of reduced diameter D, a first interior containing surface 23 of reduced diameter D and a second interior containing surface 24 of reduced diameter D.

The female plug connector 10 is further comprised of a tubular insert 30 which is slidably received in the outer sleeve 20. The back end 36 of the insert 30 is adapted to accept cable or the like. As in the jack 1, the tubular insert 30 of the plug 10 may house one or more inner conductors separated by a dielectric material. Extending from the other end of the insert 30 to the interior portions thereof are longitudinal slits forming slotted members 37 to allow radial expansion. The outer surface of the insert 30 has outer annular projections 33, a first outer containing surface 34, and a second outer containing surface 35. On the inner surface of the insert 30 are interior protrusions 32 of reduced diameter A corresponding in configuration to the annular groove 4 of the jack 1.

The plug connector 10 further includes a first split washer 41, disposed around the insert 30, which bears against the first interior containing surface 23 of the sleeve 20 and the first outer containing surface 34 of the insert 30. Also disposed around the insert 30 is a second split washer 42, which bears against the second interior containing surface 24 of the sleeve 20 and the second outer containing surface 35 of the insert 30. The two split washers 41, 42 serve as a retaining means for a helical spring 43 which is disposed around the insert 30 between the washers 41 and 42. This spring 43 is a biasing means by which the sleeve 20 is kept in its normal position relative to the insert 30. Disposed around the slotted members 37 of the insert 30 is a retaining ring 44 which adds compression to the slotted members 37 of the insert 30, and aids in the engagement of the plug 10 with the jack 1. Beryllium copper is a preferred material for this ring 44 because of its resilience.

The jack 1 and the plug 10 are engaged by applying an axial force on the sleeve 20 in a direction towards the jack 1. Referring to FIG. 1, diameter E of the jack 1 is slightly less than diameter B of the plug. When plug diamter A, which is less than diameter E of the jack 1, engages diameter E, the slotted members 37 of the plug 10 tend to spread in order to overcome diameter E. However, because the gap between plug diameters C and D is less than the gap between diameters A and E, the slotted members 37 of the plug 10 cannot expand. The outer annular projections 33 defining diameter C bear against the interior locking surface 22 of reduced diameter D and prevent the slotted members 37 from expanding.

Figure 3:
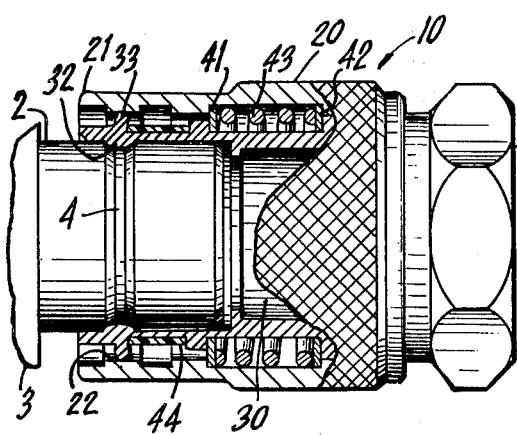
FIG. 3 is a side view of the jack and plug of the subject invention depicted in the locked position. The plug is sectioned in part.

When an axial force is applied to the sleeve 20 in a direction towards the jack 1, the second interior containing surface 24 of the sleeve 20 compresses the spring 43 allowing the sleeve 20 to move relative to the insert 30. As a result, the outer annular projections 33 (diameter C) of the insert 30 are disposed in the space between the locking surface 22 and first interior containing surface 23 of the sleeve 20, and the slotted members 37 of the insert 30 may expand to receive the jack 1. When the interior protrusions 32 of reduced diameter A reach the groove 4 of the jack 1, the ring 44 forces the protrusions 32 into the groove 4. As the sleeve 20 is released, the spring 43 returns it to its normal position, and the outer annular projections 33 of the insert 30 again bear against the locking surface 22 of the sleeve 20, preventing the slotted members 37 of the insert 30 from expanding. This, as depicted in FIG. 3 is the locked position. No axial force applied to either connector, except to the sleeve 20, can cause an unmating.

Figure 4:
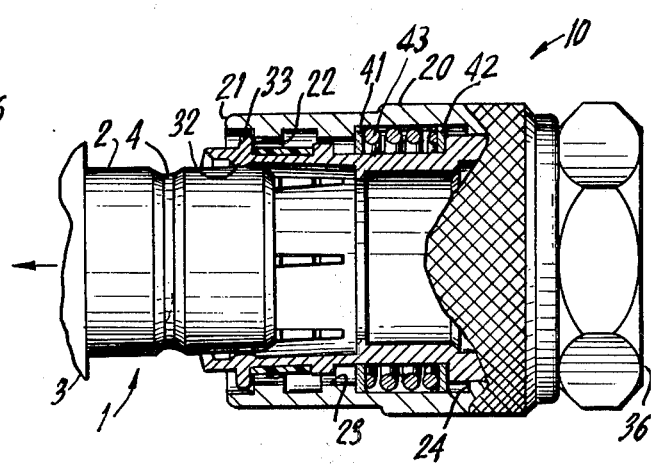
FIG. 4 is a side view depicting the discengagement of the jack and plug of the subject invention. The plug is sectioned in part.
Figure 5:
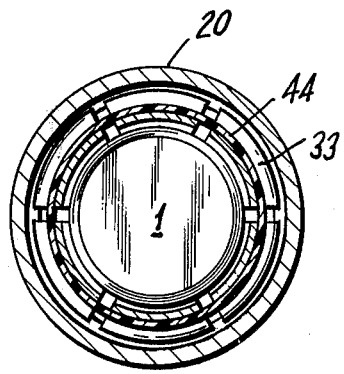
FIG. 5 is a vertical cross-section of the jack and plug of the subject invention defined by line 5—5 in FIG. 2.
Figure 7:
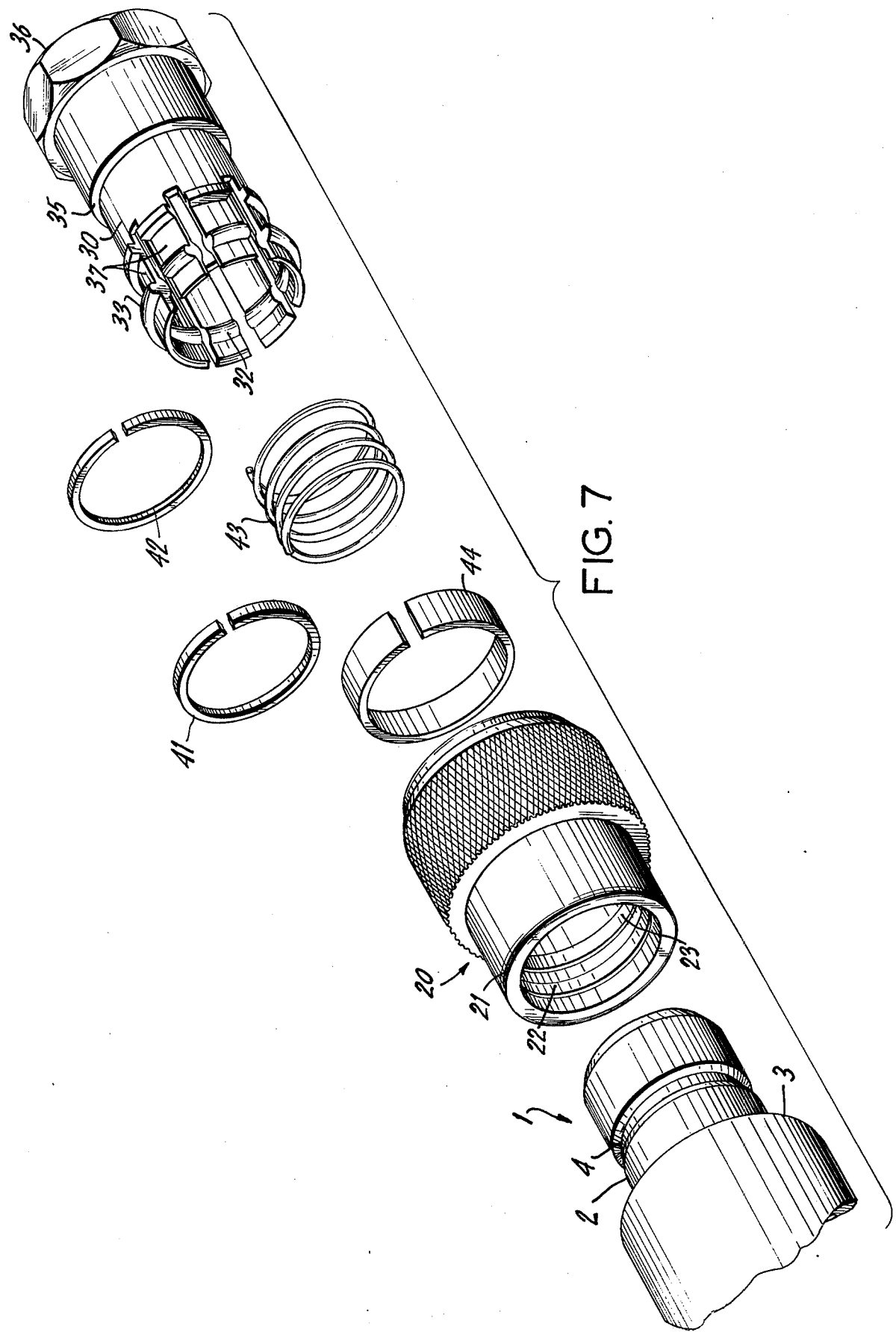
FIG. 7 is an exploded perspective view of the component parts of the jack and the plug of the subject invention.

Referring to FIG. 4, the connectors are disconnected by applying an axial force to the sleeve 20 in a direction away from the jack 1. The first interior containing surface 23 of the sleeve 20 compresses the spring 43 and the sleeve 20 moves relative to the insert 30. As a result the outer annular projections 33 of the insert 30 are disposed in the space between the annular edge 21 and the locking surface 22 of the sleeve 20. The slotted members 37 of the insert 30 may now expand, and the jack 1 may be disconnected.

In summary, the subject invention provides improved coaxial multiconductor connectors which exhibit quick connect-disconnect, and positive locking features. As opposed to existing connectors, and specifically connectors made in accordance with Brishka U.S. Pat. No. 3,782,840, the connectors of the subject invention are reliable, and will not fail or malfunction after extended use. In addition, the component parts of the subject invention and the manner in which they are assembled and cooperate together, provide connectors that are simpler in construction and less costly to manufacture.

While the preferred embodiment of the subject invention has been described and illustrated, it would be obvious that various changes and modifications can be made therein without departing from the spirit of the invention which should be limited only by the scope of the appended claims.

What is claimed is:

1. A female plug connector for use in combination with a standard male jack, said male jack including a tubular body having an annular groove disposed intermediate its length, said female plug connector comprising:
    a. a tubular outer sleeve including:
        i. an annular edge at one end;
        ii. an interior locking surface of reduced diameter; and
        iii. first and second interior containing surfaces;
    b. a tubular insert slidably received in the outer sleeve, said tubular insert including:
        i. at one end of said insert, longitudinally extending slits forming slotted members to allow radial expansion;
        ii. interior reduced diameter protrusions corresponding in configuration to the annular groove of the jack.
        iii. outer annular projections which bear against the locking surface of the outer sleeve when the female plug connector is in the locked position; and
        iv. first and second outer containing surfaces;
    c. a first retaining means bearing against the first interior containing surface of the outer sleeve and the first outer annular containing surface of the tubular insert;
    d. a second retaining means bearing against the second interior containing surface of the sleeve and the second outer annular containing surface of the tubular insert;
    e. biasing means disposed between the first and second retaining means for locating the outer sleeve in its normal position relative to the tubular insert; and
    f. a retaining ring disposed around the slotted members of the tubular insert, between the outer annular projections of the tubular insert and the first retaining means.

2. A female plug connector as recited in claim 1 where the biasing means is a helical spring.

3. A female plug connector as recited in claim 1 where the first and second retaining means are split washers.

4. A female plug connector as recited in claim 1 where the retaining ring is made from beryllium copper.

5. A female plug connector as recited in claim 1 in which the tubular insert houses at least one inner conductor.

6. A female plug connector for use in combination with a standard male jack, said male jack including a tubular body having an annular groove disposed intermediate its length, said female plug connector comprising;
  a. a tubular outer sleeve including:
    i. an annular edge at one end;
    ii. an interior locking surface of reduced diameter; and
    iii. first and second interior containing surfaces;
  b. a tubular insert slidably received in the outer sleeve, said tubular insert being able to house at least one inner conductor, said tubular insert including:
    i. at one end of said insert, longitudinally extending slits forming slotted members to allow radial expansion;
    ii. interior reduced diamter protrusions corresponding in configuration to the annular groove of the jack.
    iii. outer annular projections which bear against the locking surface of the outer sleeve when the female plug connector is in the locked position; and
    iv. first and second outer containing surfaces;
  c. a first split washer bearing against the first interior containing surface of the outer sleeve and the first outer annular containing surface of the tubular insert;
  d. a second split washer bearing against the second interior containing surface of the sleeve and the second outer annular containing surface of the tubular insert;
  e. biasing means disposed between the first and second split washers for locating the outer sleeve in its normal position relative to the tubular insert; and
  f. a beryllium copper retaining ring disposed around the slotted members of the tubular insert, between the outer annular projections of the tubular insert and the first retaining means.

7. A female plug connector as recited in claim 6 in which the biasing means is a helical spring.

* * * * *